TELEPHONE DIALING AND CODE TRANSMITTING SYSTEM

Filed June 6, 1957 4 Sheets-Sheet 1

INVENTORS
Frank J. Duca
and Willis E. Phipps.

BY Herbert M. Birch
ATTORNEY

INVENTORS
Frank J. Duca,
and Willis E. Phipps
BY Herbert M. Birch
ATTORNEY

Dec. 30, 1958 F. J. DUCA ET AL 2,866,850

TELEPHONE DIALING AND CODE TRANSMITTING SYSTEM

Filed June 6, 1957 4 Sheets-Sheet 3

INVENTORS

Frank J. Duca
and Willis E. Phipps

BY Herbert M. Birch
ATTORNEY

INVENTORS
Frank J. Duca
and Willis E Phipps
BY Herbert M. Birch
ATTORNEY

United States Patent Office 2,866,850

Patented Dec. 30, 1958

2,866,850

TELEPHONE DIALING AND CODE TRANSMITTING SYSTEM

Frank J. Duca and Willis E. Phipps, Mobile, Ala.

Application June 6, 1957, Serial No. 663,953

12 Claims. (Cl. 179—5)

Our present invention relates to dial telephone systems and more particularly to an automatic dialing means adapted to be installed for use on a standard telephone receiver unit for picking up a signal and transmitting this signal to a central station or the like.

An object of our invention is to provide a novel dialing arrangement responsive to an electrical relay system adapted to be actuated by unauthorized entry of an enclosure, house, safe or the like or by operation of a fire detection and sprinkler, to thereby dial the telephone on the premises of the place of unauthorized entry or disturbance for communication with the police or the fire department.

Another object is to provide for transmitting by coded sound, such as a buzzer, record tape or the like, the exact location of a disturbance in a building to the police, fire department, answering service, central station or the like provided with the proper facilities, such as a connected telephone, to receive the said coded sound messages.

With these and other objects in view, the invention consists in the construction, arrangement and combination of parts in conjunction with standard telephone dial sets, as hereinafter described, and particularly pointed out in the claims, it being expressly understood that we do not intend to limit ourselves to the details of construction.

In the drawings like parts throughout the several views are given like numerals and are thus identified in the following description:

Figures 4, 4A, 9:
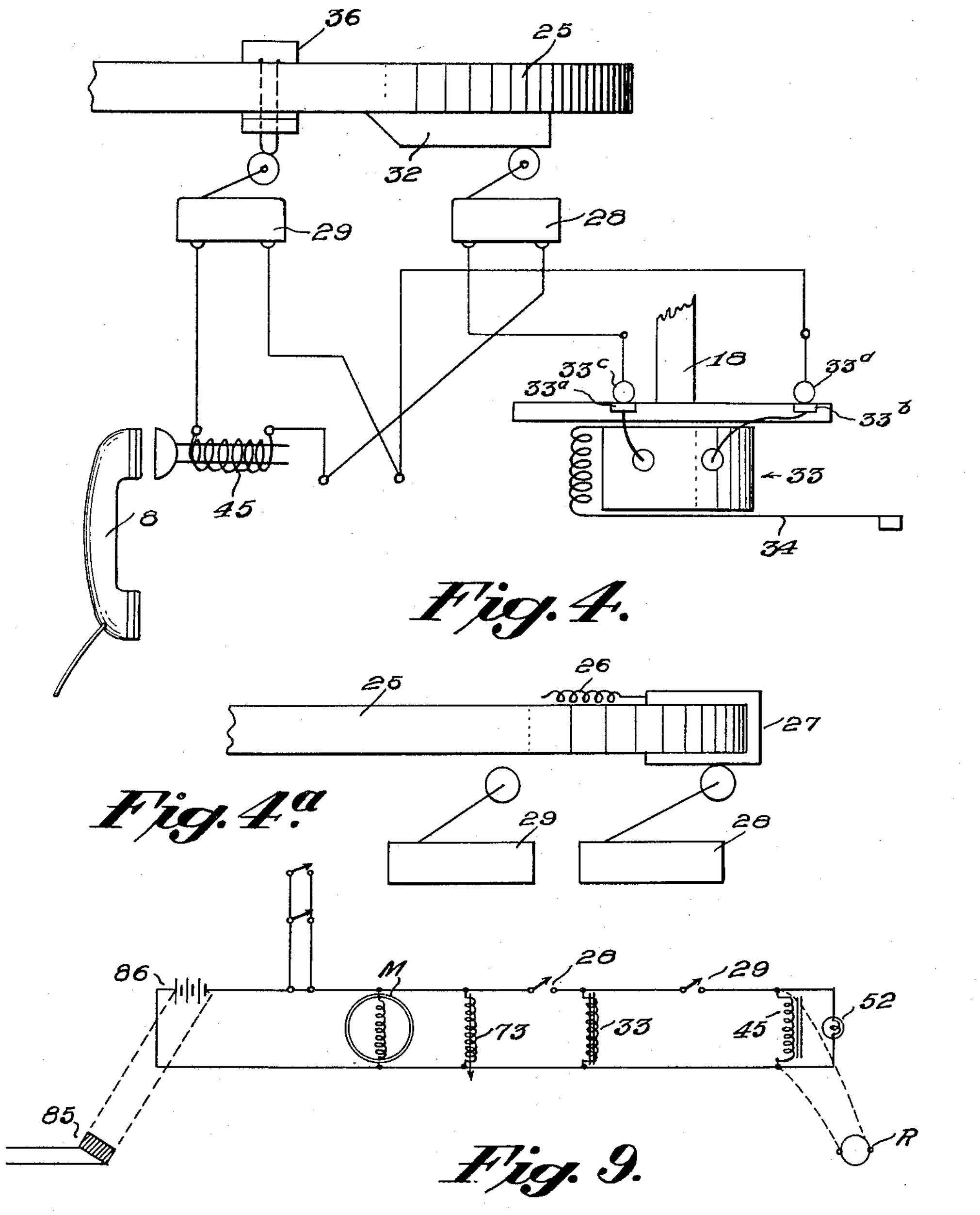
Figure 4 is a semi-diagrammatic side view showing the functions of the timer and code wheel switches during a coding cycle with the dialing arm in neutral position and also including the code buzzer and telephone receiver.
Figure 5:
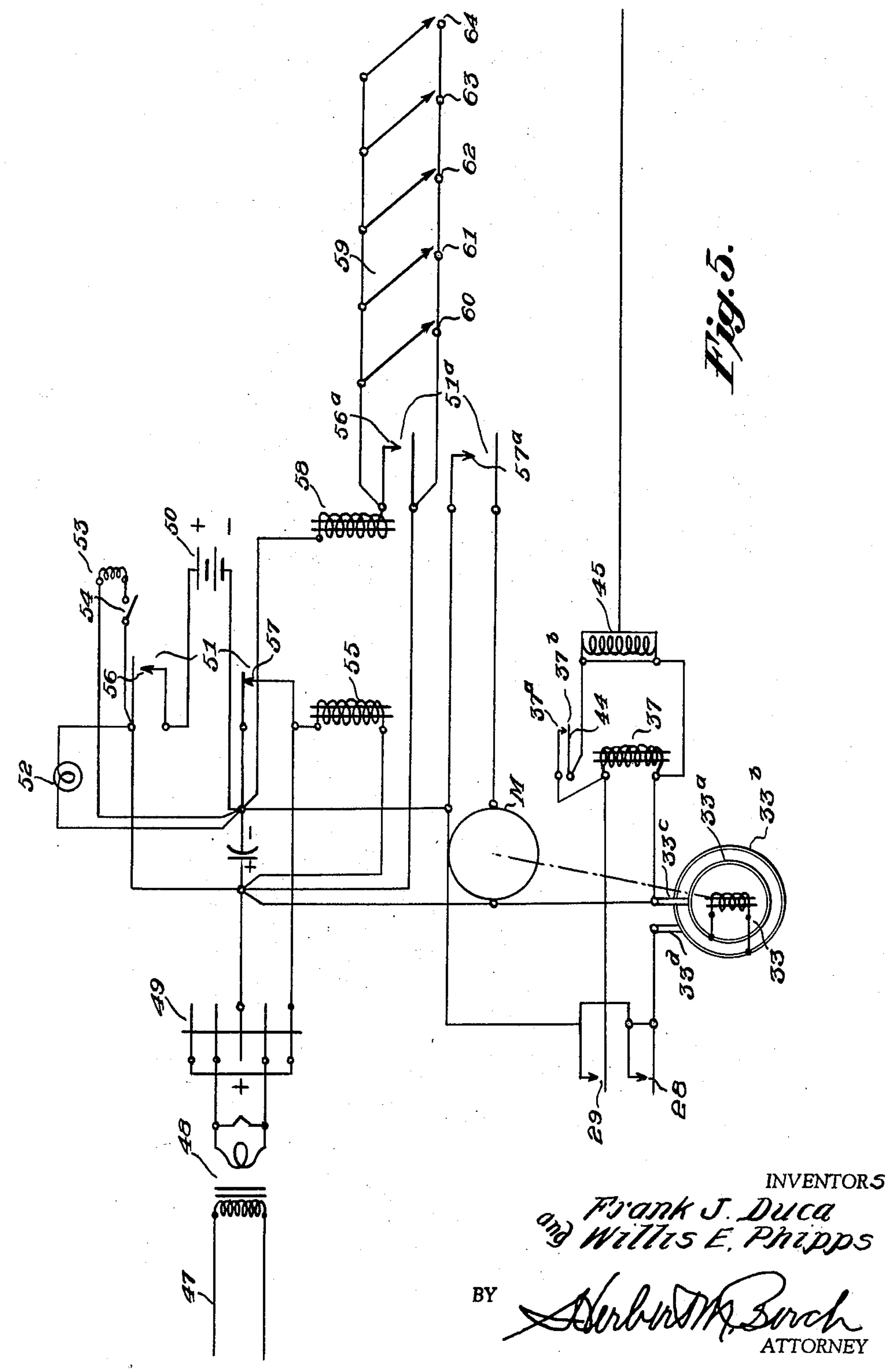
Figure 6:
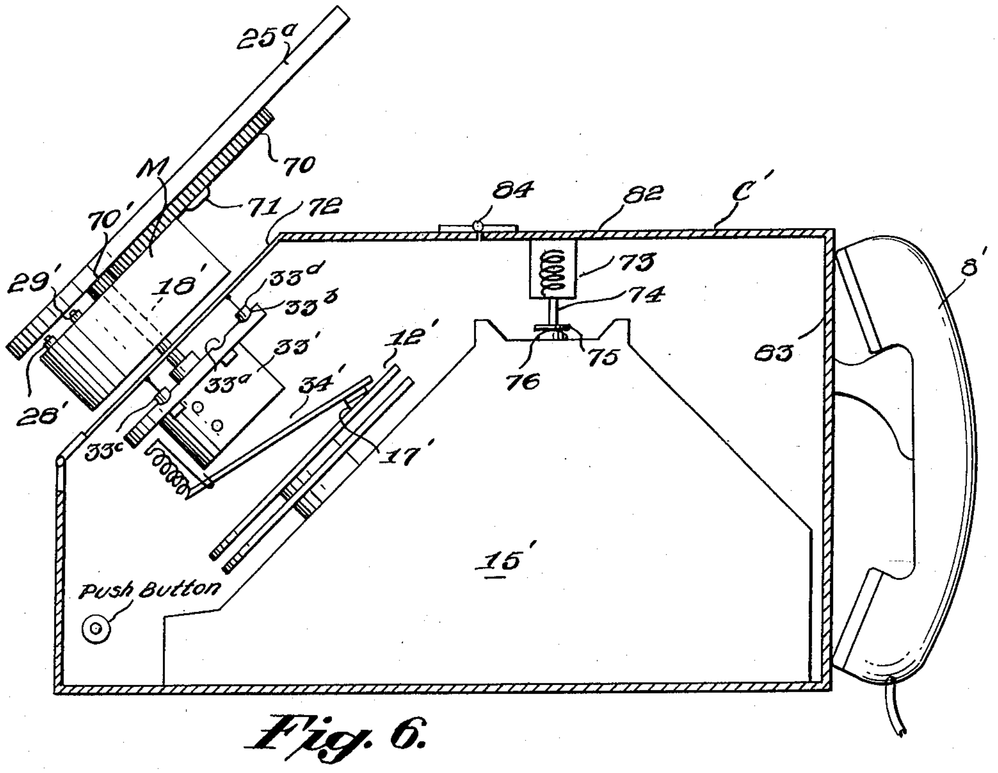
Figure 7:
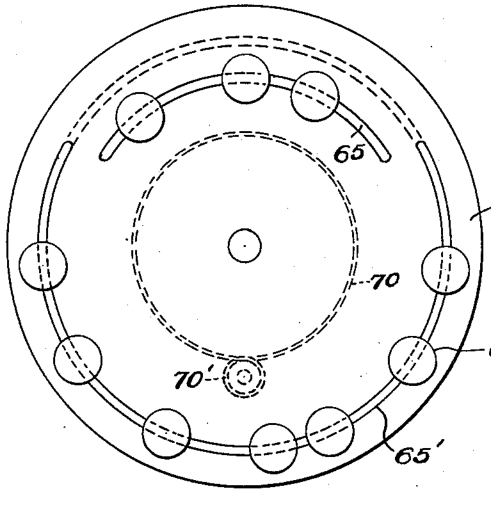

Figure 4*a* is illustrative of the alternate action with the code switch open and dial switch closed;

Figure 5 is a diagrammatic view of a circuit arrangement for our novel signal dialing system, illustrating a buzzer code transmitter arrangement and a fire detector arrangement for initiating the operation thereof;

Figure 6 is a second embodiment of the dial installation;

Figure 7 is a top plan view of a second form of timer and code wheel; and

Figure 8:
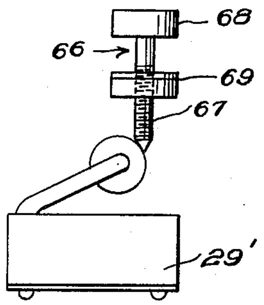

Figure 8 is an enlarged detail of the switch tripping, pins mounted in the code wheel, illustrating their respective adjustable characteristics with respect to the switch means either for dialing by a first switch or for coding by a second switch mounted below the wheel.

Figure 9 is diagrammatic illustration of the present circuit equipped with a trickler circuit as a safety feature.

Referring to the drawing, and first with respect to

Figure 1:
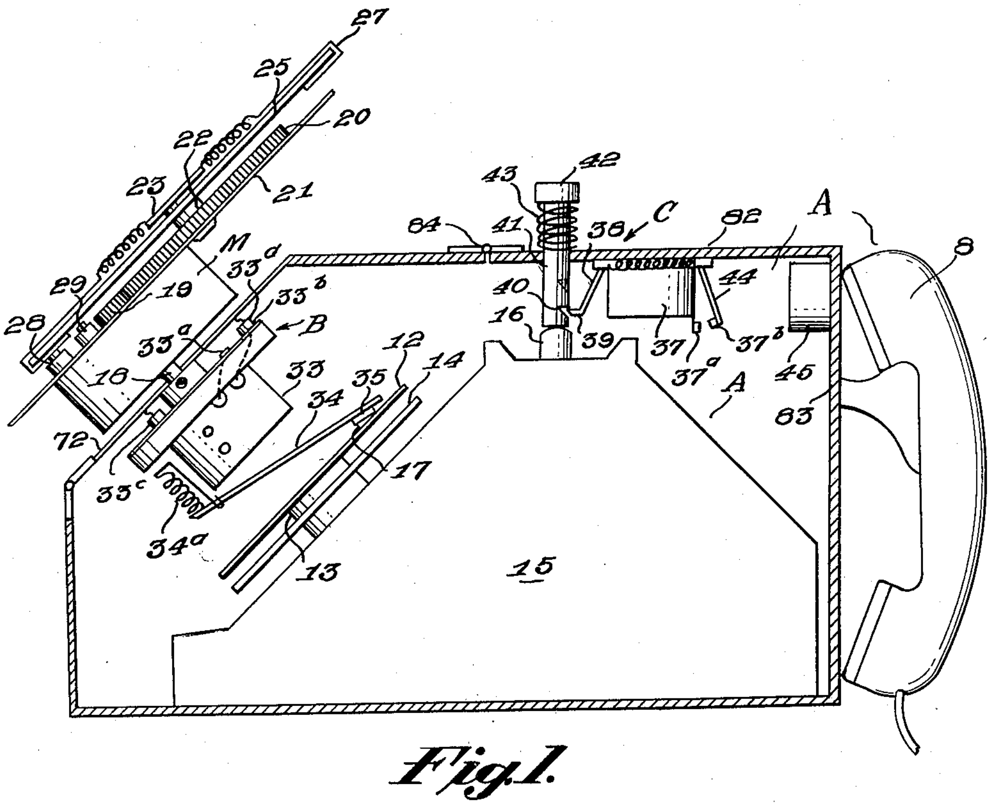
Figure 1 is a side cross sectional view of a container with a dial telephone base mounted therein and our novel dialing installation associated therewith illustrated in elevation.

Figure 1, there is illustrated the usual telephone receiver set A comprising the main telephone body 15 with contacts 16 on which the receiver 8 normally rests, a telephone dial 14, a dial cover 12 and a plastic dial cover cup 13. On the dial cover is a dial projection 17 adapted to be engaged by the present novel automatic dial mechanism B. The entire arrangement is mounted in a casing C as hereinafter will be more fully described as the description proceeds.

This automatic mechanism B comprises an angularly mounted electric motor M in a plane above the telephone dial cover 12, which motor is energized by one of several arrangements, such as burglar, fire, or like systems to be referred to later.

The motor M is provided with a rotor shaft 18, which extends from each opposite end of the motor casing. One end of the shaft 18 has keyed thereto a spur gear 19, which meshes with a relatively larger gear 20, to provide for example a 10 to 1 drive ratio. The gear 20 is journalled in a plate 21 by means of a stub shaft 22, to thereby be rotatably driven from the motor M. On the free end of the stub shaft 22 is a disc 23 and spaced below the disc on said shaft is a code and timer wheel 25.

Figure 3:
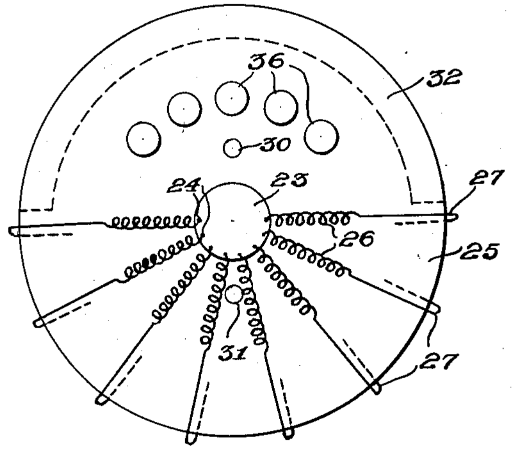
Figure 3 is a top plan view of one embodiment of our novel timer and code wheel.
Figure 2:
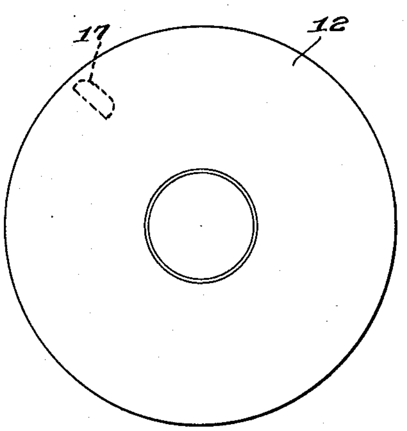
Figure 2 is a top plan view of a dial cover plate.

The disc 23 is formed with a plurality of spaced apertures 24 each for a respective spring 26 connecting with a respective switch trip 27 arranged in a predetermined code calibrated for dialing a telephone number by successively closing a dial switch 28, see Fig. 1. The code wheel 25 is secured to the gear 20 by means, such as screws 30 and 31, see Figures 1 and 3.

Mounted below the code wheel 25 are two switches, 28 and 29, respectively. Switch 28 is activated as the motor M drives the timer and code wheel 25 by an arcuate runner or cam plate 32 to energize a relay unit 33 mounted on the opposite end of the motor's rotor shaft 18 and connected through slip rings 33*a* and 33*b* by slip ring brushes 33*c* and 33*d*; in order to neutralize or disengage an armature 34 of the relay 33, so that the projection 35 on the arm 34 is in an up position and out of engagement with the dialing projection 17 against the tension of a spring $34^a$ on the dial cover 12. This is necessary during the actuation of the code switch 29 by a group of projecting trips 36 formed and arranged arcuately on the underside of the timer and code wheel 25 in a path concentric to the inner arcuate edge of the runner or cam 32, which controls dialing switch 28, see Figure 3. As the trips 36 are caused to rotate with the wheel 25 the same engage the code switch 29 and energize a double acting relay 37 having an armature 38 with a latch end 39, which latch is normally engaged in a notch 40 in a shaft 41 with a head or cap 42 extending from outside of the casing C, see Figure 1.

The shaft 41 has coiled thereon a spring 43, which is compressed between the head 42 and the top of the casing C when the latch 39 is engaged in notch 40. However, when the relay 37 is energized the shaft 41 is raised from the telephone receiver contacts 16, which lift to permit the automatic dialing to begin by means of dialing unit 33. The telephone contacts 16 are thus held in closed operating position throughout the dialing and code transmitting cycle until the spring biased shaft 41 is returned to its latched position. Also, when relay 37 is energized the contacts $37^a$ and $37^b$ are simultaneously closed by the relay through contact arm 44 and a coded sounding means, such as a buzzer 45 responsive to the code system is annunciated for transmitting such code to a central station.

The buzzer 45 is only one arrangement which may be used for transmitting a message and the coding switch 29 and tripping pins 36 may close circuits, to a blinking light or actuate a tape recorder or the like, not shown.

Or as described hereinafter a relay may be closed by a bank of thermally closed switches to dial the fire department, see Figure 5.

The power circuit for the system illustrated diagrammatically in Figure 5 may be either an open or a closed circuit through the several relay arrangements and to provide for the most effective performance when connected to an A. C. line 47, see Figure 5, connects by a step down transformer 48 to a rectifier 49. Also, provision is made for power failure, so the system will automatically change over to a battery 50 when double pole switches 51 and 51ᵃ are actuated to cause the change over. Also, a power failure pilot lamp 52, a power failure buzzer 53 with a buzzer switch 54 for on and off buzzer control may be included. The power failure network is controlled through relays 55 and 58, which relays hold the first and second contacts 56 and 57 and 56ᵃ and 57ᵃ, respectively, of the double pole switches 51 and 51ᵃ normally open and normally closed when the current is on, but when power fails this condition reverses their respective positions to normally closed and normally open positions upon power failure to connect the circuit of the battery 50 in the system.

The relay 58 is arranged to be energized by the normally open circuit 59, which may include a bank of thermal switches 60, 61, 62, 63 and 64 responsive to fire or excessive heat conditions, see Figure 5.

Figures 6, 7 and 8 illustrate a slightly different form of our invention. For example, the code wheel 25ᵃ is modified with an arcuate slot 65 in a plane above code switch 29' for adjustably mounting code switch tripping pins 66 having threaded shanks 67 and knurled heads 68 for threaded adjustment in washers 69 having a complementary center threaded portion, see Figure 8. Also, the dial switch 28' is actuated by pins 66' in slot 65'. The code wheel is secured directly to the large gear 70 in centered relation to the driven stub shaft 71. The motor M' is mounted exteriorly of the casing C' on a hinged panel 72 formed of Plexiglas or other suitable material with its drive shaft 18' and a spur gear 70' in mesh with gear 70.

Also, the relay 73 is changed to eliminate the telephone contact shaft 41, notch 40 and spring 43 of the first embodiment, and provides instead a solenoid armature 74 with a foot part 75, which engages the telephone contacts 76 and the same is raised when the solenoid 74 or relay is energized by the dial switch 28'. The solenoid 74 is self latching and is held in a raised position throughout the dialing and code transmitting cycles as is the rod 41 in the embodiment of Fig. 1. The buzzer circuit of embodiment 1 may or may not be included with arrangement as desired. However, any suitable coding arrangement is intended to be connected into the code transmitting circuit, such code being determined by the adjustment of the slot carried switch pins 66 for a corresponding calibration of the dial numbers on the telephone dial plate operating in conjunction with coding switch 29', see Figures 7 and 8.

The telephone enclosing casings C and C' of both embodiments are both basically alike. For example, the front panel 72 of both forms is slanted to be substantially parallel with respect to the angularly mounted telephone dials 12 and 12' and a portion of the top wall 82 and the entire rear wall 83 of the casing C or C' is mounted on a hinge 84, so as to swing up to permit insertion and removal of the telephone 15 or 15' for connection to the novel dialing and coding mechanism hereinbefore described.

The general operation of each of the foregoing embodiments is the same as far as the basic circuit controls are concerned. For example, briefly the system is energized by any one of several conditions resulting from burglar tripping of the relays or from high heat conditions resulting from fire and the motor M is thus started to drive the timer and dial wheel 25 or 25', operate the dial switches 28 or 28' and the code switches

29 or 29', to thus dial and transmit the code or signal to the police or fire departments according to the coding group of contacts for the particular system actuated, that is, the burglar or the fire system.

As the coding switches 29 or 29' are actuated, the connected relay means are energized to operate the coding buzzer, a tape recorder or whatever form of transmitting unit that may be connected in the circuit.

Thus there is provided a novel telephone dialing and signal transmitting system energized by a condition to be distantly detected by a receiver of such transmitted signal to drive a motor and thereby through a gear train close a switch circuit to energize a relay, and disengage the telephone contacts. Then as the motor drives the dial and code wheel 25 or 25' at approximately ten revolutions per minute a connection from the motor drive and switches 28' and 29' through slip rings, a relay dialing unit with a dialing arm having a projection on the free end thereof moves continuously clockwise and engages and disengages a dial cover projection, which is a functional result of a plurality of switch trips carried by the dial and code wheel.

In some instances the present circuit is trickler equipped as illustrated in Figure 9 as a safety factor. Thus a trickler or condenser 85 is shown connected to the power pack or battery 86 and the motor 33 or 33', the previously described solenoid means 73 to release the telephone contacts, the relay of the dial arm 34 to control the code wheel switches 28 and 29, respectively, and to actuate an audible or visual signal, such as the buzzer 45, pilot blinker light 52 or a recorder R.

Without further description, it is believed that the foregoing is sufficiently clear and detailed to give others skilled in the art a clear understanding of the same. It is to be expressly understood, however, that while the several parts and combinations thereof are described in detail, it is not intended to limit our invention specifically to such details. For a definition of the scope of our invention, reference should be had to the appended claims.

What is claimed is:

1. An electrically operated dial and code transmitting means for standard telephone receiver sets comprising means for mounting an electric motor in a plane parallel to the dial face of the telephone, a dial cover for said dial face, said motor having a casing with a drive shaft extending from each end thereof, a spur gear keyed to one end of the motor drive shaft and a relay and dialing arm drivably connected to the other end thereof, said dialing arm being formed on its free end with a dial cover engaging projection, said spur gear being in mesh with a relatively larger gear, a timer and code wheel secured to said large gear, switch means being mounted in a plane below said large gear and said wheel, said wheel carrying switch operating means for engaging said switch means, a condition responsive circuit connected to said motor adapted to energize the same and rotate the said wheel, to thereby initiate a dialing and a code transmitting cycle, said code cycle being provided by a plurality of switch closing members spaced for a particular code to be transmitted, a code transmitting relay means electrically connected to be energized by a second switch means, and a code operated transmitter means energized by said last-named relay in the circuit with said second switch means.

2. An electric telephone dialing system for a standard French-type telephone with a dial plate and cover, said telephone comprising a base with receiver released contacts, a self-latching solenoid means for controlling said telephone contacts when the receiver is removed, said solenoid means being energized by an electric switch connected with a source of electric current through an alarm circuit, a second switch in said circuit, an electric motor in said alarm circuit having a drive shaft, a drive means in said shaft, a dialing and code transmitting wheel including means driven by said drive means on the motor shaft rotated by said motor, said wheel having dialing means carried thereby adapted to open and close said second switch to dial a station, and said wheel having coding means carried thereby adapted to close said electric switch connected to said solenoid means, to thereby release the telephone contacts simultaneously with said dialing operation.

3. The dialing system described in claim 2, wherein the said dial and code wheel carries a plurality of spaced switch trip members for engaging the said second switch, and a relay unit including a dialing armature adapted to be energized by the actuation of said second switch, to thereby raise and lower the said armature with respect to the telephone dial plate, and said free end of said armature being engageable with said dial plate when lowered to rotate the same for a dialing action thereof.

4. Apparatus for electrically dialing a preselected telephone number on a dial telephone comprising in combination a telephone contact relay means for switching the telephone in and out of circuit, an electric motor in a power circuit, means for switching said motor into the said circuit to energize the same, a dial wheel driven by said motor, switch actuating means carried by the wheel, switch means opened and closed by said wheel carried means, a relay connected in the switch circuit with an arm, said arm being a mechanical dialing arm adapted to rotate in a circle concentric to a telephone dial for rotating the same, said actuating means causing said dialing arm to be raised and lowered for each dialing cycle, and a sound transmitting system adapted to be simultaneously actuated to transmit a signal over the telephone to a distant receiver station after said distant station has been dialed by said motor driven dial arm.

5. The apparatus described in claim 4, wherein the said power circuit for said motor includes a standby battery circuit and relay means adapted to change over thereto upon power failure.

6. The apparatus described in claim 4 wherein the said sound transmitting system is energized by a second switch means and a second switch actuating means mounted on said dial wheel.

7. The apparatus described in claim 4, wherein the said switch actuating means comprises a plurality of spaced strips arranged to correspond to the dial numbers for a distant receiving station.

8. The apparatus described in claim 4, wherein the said telephone contact relay means includes a second armature means adapted to close a switch, said switch being adapted to close a circuit to a signal transmitting device.

9. A telephone dialing system having a dial plate and signal transmitting system in combination comprising a motor driven dial and signal wheel, a dial switch and a signal switch mounted in a plane below said wheel, switch trip means carried by said wheel, said trip means being disposed in arcuate paths, one path of said trip means being for dial control and the other path of said trip means for signal control, means for energizing said motor, a relay and projecting armature arm rotatable by said motor, a dial plate engaging projection on the free end of said arm, said arm being raised and lowered with respect to said dial plate by said dial switch, thereby controlling the dialing of numbers to the proper receiver stations.

10. A telephone dialing system having a dial plate and signal transmitting system in combination comprising a motor driven dial and signal wheel, a dial switch and a signal switch mounted in a plane below said wheel, switch trip means carried by said wheel, said trip means being disposed in arcuate paths, one path of said trip means being for dial control and the other path of said trip means for signal control, means for energizing said motor, a relay and projecting armature arm rotatable by said motor, a dial plate engaging projection on the free end of said arm, said arm being raised and lowered with respect to said dial plate by said dial switch, thereby controlling the dialing of numbers to the proper receiving stations, and a signal switch operated electro-magnetic device energized during said dial operation, said electro-magnetic device operating an electric signal means, said signal means being associated with the telephone receiver, to thereby transmit the signal to a remote station.

11. The telephone dialing system of claim 9, wherein the said trip means comprise groups of adjustable metal pins mounted in arcuately arranged slots formed in the said dial and signal wheel.

12. The telephone dialing system of claim 10, wherein said motor and dial and code switches include a trickler circuit.

References Cited in the file of this patent

UNITED STATES PATENTS

| | | |
|---|---|---|
| 2,674,658 | West | Apr. 6, 1954 |
| 2,723,314 | Vasselli | Nov. 8, 1955 |
| 2,742,971 | Holmes | Apr. 24, 1956 |
| 2,763,778 | De Mevlenaere | Sept. 18, 1956 |
| 2,769,032 | Strother | Oct. 30, 1956 |